(12) United States Patent
Yao

(10) Patent No.: US 6,368,562 B1
(45) Date of Patent: Apr. 9, 2002

(54) LIQUID TRANSPORTATION SYSTEM FOR MICROFLUIDIC DEVICE

(75) Inventor: Xian-Wei Yao, Edison, NJ (US)

(73) Assignee: Orchid BioSciences, Inc., Princeton, NJ (US)

(*) Notice: Subject to any disclaimer, the term of this patent is extended or adjusted under 35 U.S.C. 154(b) by 0 days.

(21) Appl. No.: 09/292,868

(22) Filed: Apr. 16, 1999

(51) Int. Cl.[7] .................................................. B01L 3/00
(52) U.S. Cl. ............................ 422/100; 422/99; 422/70
(58) Field of Search ............................ 422/99, 100, 58, 422/59, 68.1, 69, 70; 436/179, 180

(56) References Cited

U.S. PATENT DOCUMENTS

| | | | |
|---|---|---|---|
| 3,953,792 A | | 4/1976 | Fletcher et al. |
| 4,049,200 A | | 9/1977 | Sobol |
| 4,284,496 A | | 8/1981 | Newton |
| 4,298,795 A | | 11/1981 | Takeuchi et al. |
| 4,301,970 A | | 11/1981 | Craighero |
| 4,318,028 A | | 3/1982 | Perel et al. |
| 4,501,965 A | | 2/1985 | Douglas |
| 4,640,140 A | | 2/1987 | Burghoffer et al. |
| 4,748,043 A | | 5/1988 | Seaver et al. |
| 4,749,125 A | | 6/1988 | Escallon et al. |
| 4,762,975 A | * | 8/1988 | Mahoney et al. |
| 4,765,539 A | | 8/1988 | Noakes et al. |
| 4,794,086 A | | 12/1988 | Kasper et al. |
| 4,826,703 A | | 5/1989 | Kisler |
| 4,842,701 A | | 6/1989 | Smith et al. |
| 4,846,407 A | | 7/1989 | Coffee et al. |
| 4,861,988 A | | 8/1989 | Henion et al. |
| 4,935,624 A | | 6/1990 | Henion et al. |
| 4,977,320 A | | 12/1990 | Chowdhury et al. |
| 5,015,845 A | | 5/1991 | Allen et al. |
| 5,157,260 A | | 10/1992 | Mylchreest et al. |
| 5,247,842 A | | 9/1993 | Kaufman et al. |
| 5,306,412 A | * | 4/1994 | Whitehouse et al. |
| 5,326,598 A | | 7/1994 | Seaver et al. |
| 5,412,208 A | | 5/1995 | Covey et al. |
| 5,415,841 A | * | 5/1995 | Dovichi et al. |
| 5,609,921 A | | 3/1997 | Gitzhofer et al. |
| 5,828,062 A | | 10/1998 | Jarrell et al. |
| 5,969,353 A | * | 10/1999 | Hsieh |
| 6,110,343 A | * | 8/2000 | Ramsey et al. |

FOREIGN PATENT DOCUMENTS

WO  WO-97/04297 A1 * 2/1997

* cited by examiner

Primary Examiner—Jan Ludlow
(74) Attorney, Agent, or Firm—Kevin G. Mierzwa

(57) ABSTRACT

A method and apparatus for fluid transportation includes a fluid reservoir and a pump that supplies fluid to a microfluidic device. The microfluidic device has an opening and an electrode positioned proximate the opening. The pump pressurizes fluid within the microfluidic device to form a droplet at the opening. When a desired volume of droplet is formed, a potential difference is generated between an electrode and a target plate. The potential difference causes the drop to form a fluid delivery therebetween. The fluid delivery may take many shapes, including a Taylor cone or a stream of droplets.

3 Claims, 3 Drawing Sheets

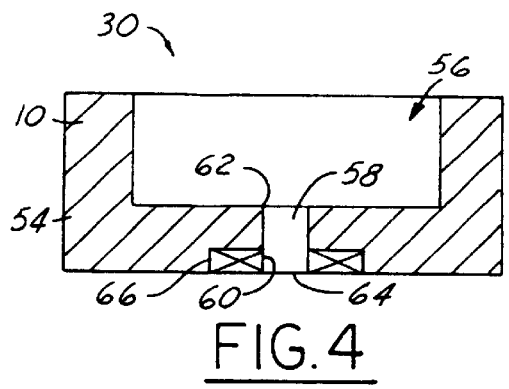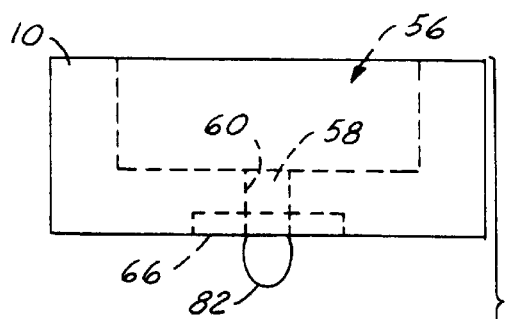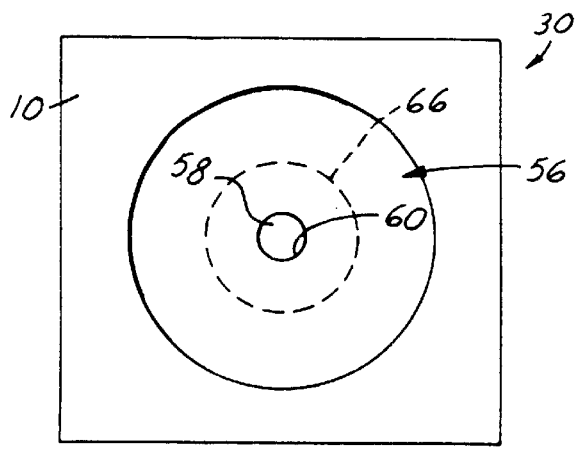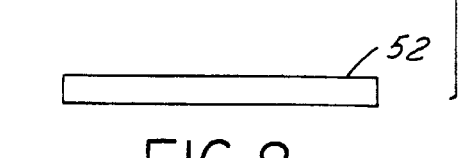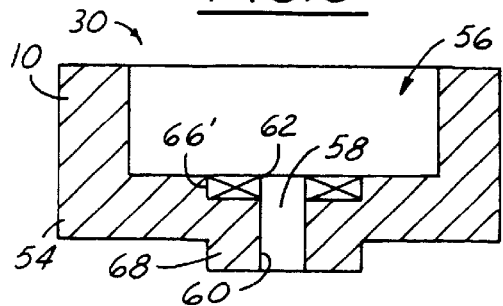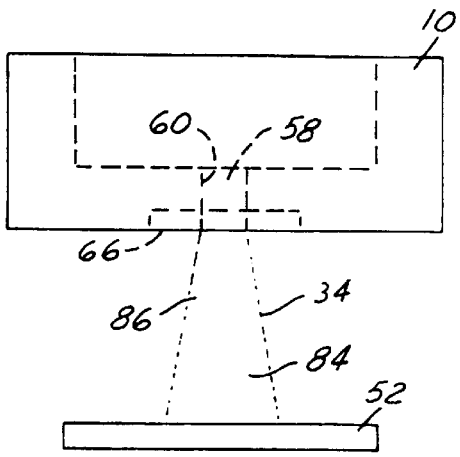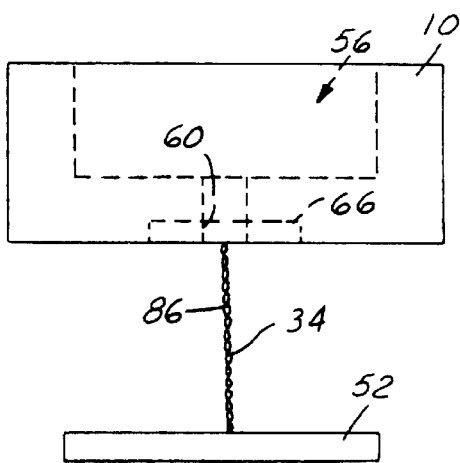

LIQUID TRANSPORTATION SYSTEM FOR MICROFLUIDIC DEVICE

TECHNICAL FIELD

The present invention relates to microfluidic devices, and more particularly, to a method and apparatus for distributing fluid within or from a microfluidic device.

BACKGROUND OF THE INVENTION

Methods of making a homologous series of compounds, or the testing of new potential drug compounds comprising a series of light compounds, has been a slow process because each member of a series or each potential drug must be made individually and tested individually. For example, a plurality of potential drug compounds that differ perhaps only by a single amino acid or nucleotide base, or a different sequence of amino acids or nucleotides are tested by an agent to determine their potential for being suitable drug candidates.

The processes described above have been improved by microfluidic chips which are able to separate materials in microchannels and move them through the microchannels. Moving the materials through microchannels is possible by use of various electro-kinetic processes such as electrophoresis or electro-osmosis. Fluids may be propelled through various small channels by the electro-osmotic forces. An electro-osmotic force is built up in the channel via surface charge buildup by means of an external voltage that can repel fluid and cause flow.

Other methods for moving materials through microchannels include, for example, pressure pumping. For this process, pressure heads are attached to the microfluidic chips and small bursts of pressured air or other gas, such as an inert gas; is directed into the microchannels.

Ultimately, the small volumes of liquids formed in the wells or reservoirs of a microfluidic device must be sampled and tested. Previous known methods for distributing and transporting fluids from the microfluidic devices include pressurizing the fluid to allow the fluid or a portion thereof to exit its chamber. One drawback to pressure pumping is that several parameters must be precisely controlled to expel a desired liquid amount. Such parameters include duration, the pulse magnitude, the channel dimension and solution viscosity.

SUMMARY OF THE INVENTION

It is, therefore, one object of the invention to provide an improved fluid dispensing system to dispense fluid from reaction wells. It is a further object of the invention to provide a controllable spray or stream of fluid for analysis.

It is yet another object of the present invention to provide a liquid handling drug discovery and diagnostic tool which increases the speed and productivity of discovering new drug candidates and does so on a miniaturized scale or platform that reduces cost and manual handling. It is still a further object of the present invention to provide a multiple fluid sample processor, system and method which is capable of conveying, transporting, and/or processing samples in a large multiplicity of sites.

In one aspect of the invention, a microfluidic fluid transportation system is coupled to a fluid pressure source. A microfluidic device has a fluid input coupled to the fluid pressure source, and a channel having an opening therein. The fluid pressure source pumps fluid into the channel to form a droplet at the opening having a predetermined volume. An electrical contact is proximate the opening and a power source is coupled to the contact. The power source selectively applies electrical power to the contact upon the formation of the droplet of a predetermined volume to form a fluid delivery.

In a further aspect of the invention, an inventive method is utilized which comprises forming a droplet having a predetermined volume of fluid at an outlet, generating a potential difference between the fluid and a target, releasing the fluid, and, directing the fluid at the target.

One advantage of the invention is that small and controlled amounts of fluid may be delivered or transported without the need to control many parameters. Another advantage of the invention is that the method for delivering fluid to microfluidic structures is applicable to structures having high integration densities and where viscous losses in micro channels are significant.

Other objects and features of the present invention will become apparent when viewed in light of the detailed description of the preferred embodiment when taken in conjunction with the attached drawings and appended claims.

BRIEF DESCRIPTION OF THE DRAWINGS

FIG. 4 is cross-sectional view of a well configured to transport liquid according to the present invention.

FIG. 5 is a top view of FIG. 4.

FIG. 6 is a cross-sectional view of an alternative embodiment of a fluid transportation system having contacts in a different position and including a nozzle.

FIG. 7 is a cross-sectional view of a microfluidic device containing a fluid transportation system for moving fluid within a microfluidic device.

FIG. 8 is a side view of a droplet formation formed according to the process of the present invention.

FIG. 9 is a side view of a spray from an opening in a microfluidic device according to the present invention.

FIG. 10 is an alternative stream of fluid from a microfluidic device.

DETAILED DESCRIPTION OF THE PREFERRED EMBODIMENT

Figure 1:
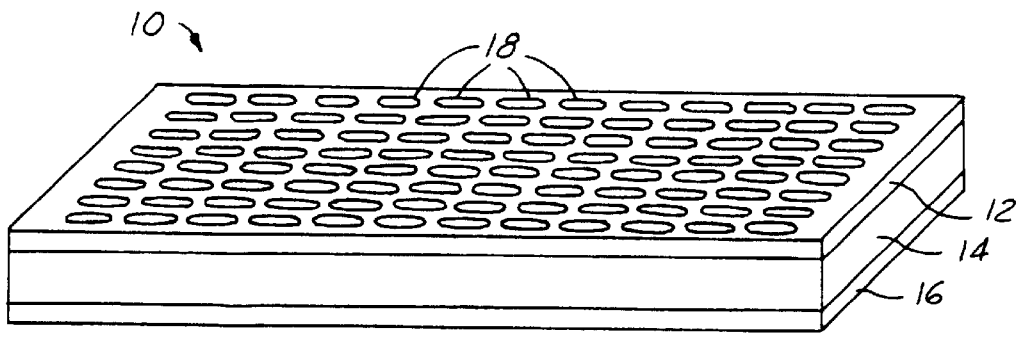
FIG. 1 illustrates a multiple fluid sample processor according to the present invention.

Referring now to the drawings, like reference numerals are used to identify identical components in the various views. As illustrated below the present invention is particularly suited for use in connection with a microfluidic device. One skilled in the art, however, would recognize that the teachings of the present invention may be well suited for use in a variety of industries such as genomics, surface coating, apportionment, proteomics and inkjet applications.

The present invention can be used particularly in the industrialization of drug discovery processes including synthesis analysis and screening. The present invention increases speed and productivity while providing researchers with expanded capabilities and assuring quality. The invention provides substantial time and efficiency advantages over prior techniques. The invention provides miniaturized liquid handling systems which perform the biological, chemical and the analytical processes fundamental to life sciences, research and development. The invention can be utilized to perform thousands of reactions simultaneously in an integrated format, which substantially reduces the time, effort and expense required while improving the quality of the test results.

The processor in accordance with the present invention generally incorporates a modular configuration with distinct layers or plates. The processor or microfluidic device 10, as shown in FIG. 1, is capable of conducting parallel synthesis of thousands of small molecule compounds through the precise delivery of reagents to discrete reaction sites. This helps create a significantly larger number and variety of small molecules more effectively and with fewer resources.

With the present invention, arrays of DNA can be synthesized and transported on demand. The processor can also be used for high volume of sample processing and testing, as well as the search for new molecular targets and determining expression levels and response to known drugs. The processor can incorporate multiple assay formats, such as receptor binding, antibody-antigen interactions, DNA/RNA amplification and detection, as well as magnetic deed base separations. The versatility of the processor and its architecture make it available for use with synthesis work stations, genomic support stations, and analytical preparation systems.

Figure 2:
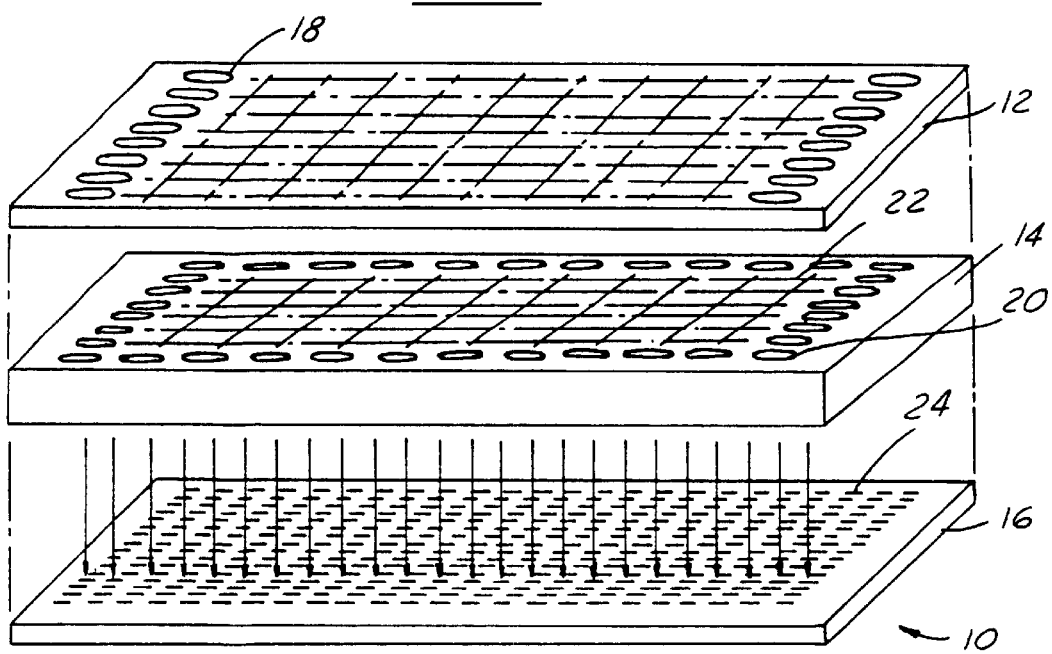
FIG. 2 is an exploded view of the processor shown in FIG. 1.

A basic multiple fluid sample processor or microfluidic device 10 in accordance with the present invention is shown in FIGS. 1 and 2. The microfluidic device is illustrated as a three-layered structure in the embodiment illustrated. The microfluidic device 10 is also called a fluid assay layered device (FALD), or a fluidic array.

The microfluidic device 10 includes a top layer 12, which is also called a reagent reservoir. The microfluidic device 10 also includes a middle layer or fluidic delivery layer 14, as well as a bottom layer or well plate 16.

The top layer 12 is also called a feed-through plate and serves as a cover for the microfluidic device 10. Layer 12 contains a number of apertures 18 which are selectively positioned immediately above apertures 20 in layer 14. Apertures 20 are connected by an elongated micro-channels 22 which in turn have a plurality of branches extending therefrom. As illustrated, layer 14 comprises one layer, however, one skilled in the art would recognize that layer 14 may comprise several layers.

Well plate 16 has a plurality of wells 24 which are used to hold the reagents and other materials in order for them to react and synthesize.

The three layers 12, 14 and 16 are stacked together to form a modular configuration. They are also coupled together tightly to form a liquid-tight seal. If desired, the top layer 12 can be bounded or fused to the center distribution plate 14 or layer. The bottom or well plate layer 16, however, is detachably coupled to layer 16.

The plates 12, 14 and 16 may be made from any desirable material, such as glass, fused silica, quartz, or silicon wafer material. The reservoirs, micro-channels and reaction cells are controllably etched or otherwise formed onto the plates using traditional semi-conductor fabrication techniques with a suitable chemical etchant or laser drilling.

Top plate 12 contains apertures 18 positioned above the openings 20 located in central plate 14. Apertures 18 provide the necessary openings for loading module to fill the reservoirs with a plurality of agents or other materials.

As will be further described below, a pressure pumping mechanism, is preferably used to assist in loading and distributing the reagents and other materials within the layers.

A typical need is for one of the sample plates to have each sample conveyed, transported and/or processed while eventually being delivered into the well plate. During this time, the samples are typically exposed to the atmosphere and can oxidize, evaporate or cross-contaminate to an undesirable extent. With the present invention, however, the multilayered sample microfluidic device 10 with detachable well plates inhibits cross-contamination of the fluids used in the combinatorial process.

The detachable layers in accordance with the present invention are preferably of a common dimensionality for ease of being handled by robotic or other automation means. A common set of dimensions has been adopted by many manufacturers which match that of the 96-well plate known as a "micro titer" plate.

Preferably, the plates 12, 14 and 16 are connected to each other by an indexing means of detents, flanges or locating pins so they are closely aligned in the horizontal and vertical directions. While engaged in such manner, samples from one of the plates can be caused to be moved and transported to another plate. Means for transporting or moving the samples from one of the plates to the other can be by pumping, draining, or capillary action. While the samples are engaged, and as a result of the transport of the samples from one layer to the other, the samples may be processed, reacted, separated, or otherwise modified by chemical or physical means, and then finalized by optical, electrochemical, chemical, or other means.

Samples or fluids can be delivered to the microfluidic device 10 by being contained in one of the members of physically engaging sample multi-well plates, such as a top layer 12, or other means of sample introduction can be utilized, such as through the edges of such layer.

Figure 3:
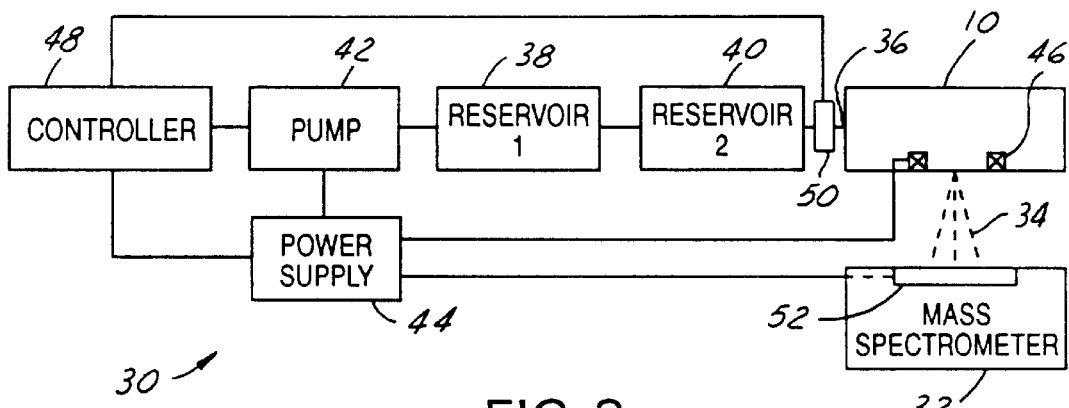
FIG. 3 is a block diagram schematic view of a microfluidic fluid transportation system according to the present invention.

Referring now to FIG. 3, a block diagram of a fluid transportation system 30 formed according to the present invention is illustrated. Fluid transportation system 30 controls the amount of fluid distributed from or within microfluidic device 10. Fluid transportation system 30 is illustrated adjacent to a mass spectrometer 32 that is used for analyzing the composition of a fluid delivery 34 from microfluidic device 10. Mass spectrometer 32 analyzes the composition of fluid delivery 34 in a well-known manner.

Microfluidic device 10 has a fluid input 36 which is coupled to a first fluid reservoir 38. As will be further described below, a second fluid reservoir 40 may also be coupled in series with first fluid reservoir 38. A pump 42 is used to move fluid from first reservoir 38 and second fluid reservoir 40 into fluid input 36.

A power supply 44 is electrically coupled to buffer reservoir or pump 42 to an electrode 46 in microfluidic device 10 and mass spectrometer 32. A controller 48 is coupled to power supply 44 and may be coupled to pump 42. Controller 48 controls the coupling of power to electrode 46, pump 42, and mass spectrometer 32. Controller 48 is preferably microprocessor based. Controller 48, however, in its simplest form may comprise a number of switches. In the microprocessor form, controller 48 may include an internal timer.

A flow meter 50 may be positioned between fluid reservoir 38 and fluid input 36. Flow meter 50 may provide feedback to controller 48 with regard to the amount of fluid transported to microfluidic device 10.

Other feedback means to controller 48 may, for example, be timing for pump 42. If pump flows at a certain rate when operated, the amount of fluid delivered to microfluidic device 10 may be determined by a timer. The timer may be incorporated within pump 42 or within controller 48 as described above.

In operation, controller 48 controls pump 42 to supply a predetermined amount of fluid from reservoirs 38 and 40. As will be further described below, as a droplet of fluid forms at an opening of microfluidic device 10, power supply 44 under the control of controller 48 applies power to contacts 46 and between a target 52. A voltage potential difference exists between contact 46 and target 52 so that fluid delivery 34 is formed therebetween.

A first reservoir 38 and second reservoir 40 may be used to electrically isolate pump 42 from microfluidic device 10. In this manner, second reservoir 40 provides isolation. Second reservoir 40 may be eliminated if another manner for electrical isolation is employed. In the illustration of FIG. 3, a single pump and a pair of series reservoirs 38, 40 are employed. However, it is likely that various numbers of pumps and reservoirs may be used to provide various reagents to microfluidic device 10.

Referring now to FIGS. 4 and 5, a portion of a microfluidic device 10 is shown. The portion shown, may, for example, be a well plate 54 having a well 56. A well plate 54 is described in FIGS. 1 and 2 as bottom layer 16. Well 56 receives fluids from the other layers of microfluidic device 10. Each fluid within each of the wells 56 of the device 10 must be analyzed. For many applications, it is desirable, however, to analyze only a small portion of the fluidic solution in well 56. A sample outlet 58 is provided from well 56 through well plate 54. An opening 60 is formed at sample outlet 60. Sample outlet also has an entrance 62 adjacent to well 56. To sample fluid from well 56, fluid moves through entrance 62 through sample outlet 58 and through opening 60.

Sample outlet 58 acts as a capillary channel from well 56. A capillary barrier or "break" 64 is formed at opening 60 of sample outlet 58. Capillary break 64 is formed by the surface tension of the fluid in sample outlet 58 when opening to a larger volume. Without a sufficiently high pressure or some other action, fluid within well 56 does not flow from sample outlet 58.

An electrode 66 is positioned within sample outlet 58. Electrode 66 is illustrated as a ring electrode positioned at opening 60. The shape of electrode 66, however, may vary depending on the application. Electrode 66 in any form should be capable of inducing a charge on fluid at outlet 58.

Referring now to FIG. 6, electrode 66' may be positioned at entrance 62 to sample outlet 58. It has been experimentally found that the position of electrodes 66, 66' in sample outlet 58 has little affect on the operation of fluid transportation system 30. A nozzle 68 may also be used to extend sample outlet 58 at opening 60. As shown, nozzle 68 forms a slight mesa that extends from the bottom of well plate 54. For most fluids, the formation of nozzle 68 has little affect on the operation of fluid transportation system 30.

Referring now to FIG. 7, a three layer microfluidic device 10 is illustrated. Fluid transportation system may be incorporated within a microfluidic device 10 for providing fluid to various locations within microfluidic device. If accurate pumps or feedback systems are used, the amounts of fluid may be metered precisely. Microfluidic device may, for example, have a top layer 70, a middle layer 72, and a bottom layer 74. Of course, the device illustrated in FIG. 7 is only a portion of a microfluidic device 10. Microfluidic device 10 may, for example, have a number of layers incorporated therein. In the present example, a capillary channel 76 is formed between top layer 70 and middle layer 72. Capillary channel 76 is ultimately coupled to a fluid reservoir such as that described above with respect to FIG. 3. Capillary channel 76 may feed an intermediate well 78 within microfluidic device 10. Electrodes 80 may be incorporated into microfluidic device to control the operation of fluid delivery as will be further described below.

Referring now to FIGS. 8 and 9, a droplet 82 is formed at opening 60 of sample outlet 58. The volume of droplet 82 may be precisely controlled by pump 42 and controller 48 of FIG. 3. Once a droplet 82 having a desired volume is formed, power supply provides a potential difference between contact 66 and target 52. Depending on the viscosity of the fluid and other characteristics, when a sufficient potential difference is applied between contact 66 and target 52, droplet 82 is formed into fluid delivery 34. The type or fluid delivery 34 may include a cone 84 as illustrated in FIG. 9. A cone is formed by charged particles 86 of droplet 82.

Referring now to FIG. 10, charged particles 86 may also form a stream between opening 60 and target 52. A stream is formed when a relatively medium voltage potential is applied between electrode 66 and target 52. The type of fluid delivery 34 obtained is dependent upon the voltage. For example, voltage in the range between 500 volts and 3 kilovolts may be used.

Figure 11:
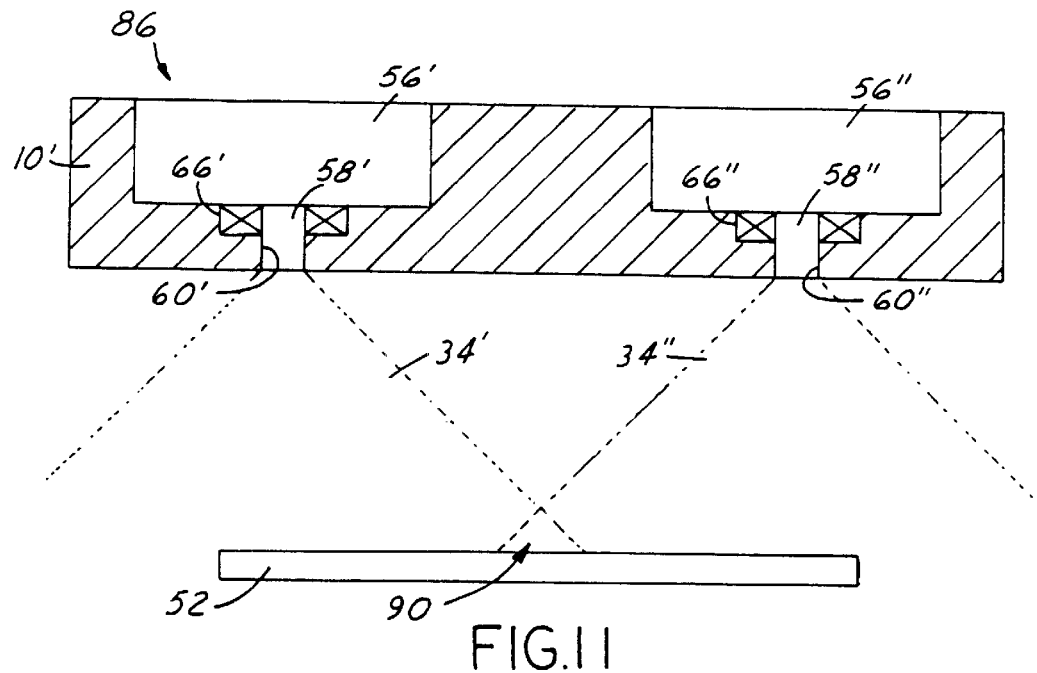
FIG. 11 is a cross-sectional view of a microfluidic device used for mixing two fluids.

Referring now to FIG. 11, an alternative microfluidic device 10' is illustrated having a first well 56' and a second well 56". Each well has a sample outlet 58' and 58". Wells 56', 56" may be coupled to the same fluids. In the preferred embodiment, however, wells 56', 56" are coupled to two different fluids. That is, wells 56', 56" may be coupled to two separate fluid reservoir/pump combinations. As described above, electrodes 66' and 66" are located within sample outlets 58', 58". When a droplet is formed in openings 60' and 60", and a voltage potential is applied between contact 60', 60" and target 52, the droplets form fluid deliveries 34', 34". In this manner, a mixing region 90 is formed by the combination of the fluid deliveries 34', 34". Target 52 may be incorporated within a receiver plate or within a mass spectrometer. It is believed that mixing region 90 provides superior distribution of fluid deliveries 34', 34" for use with a mass spectrometer.

Figure 12:
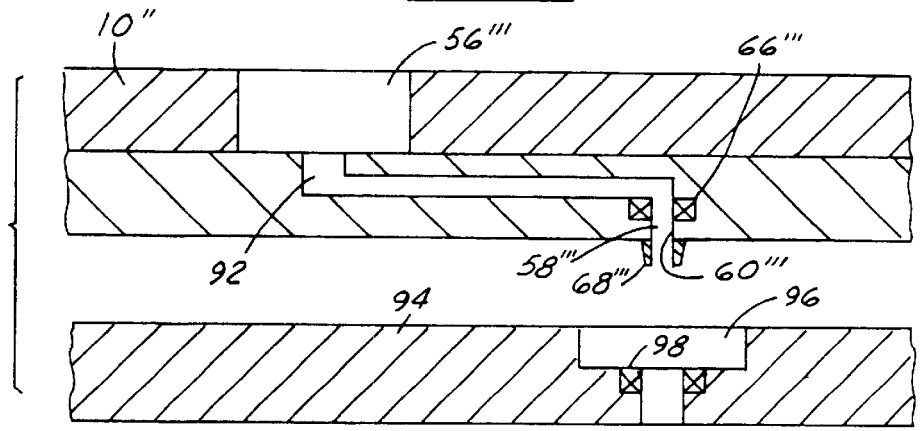
FIG. 12 is a cross-sectional view of a microfluidic device with respect to a receiving plate.

Referring now to FIG. 12, yet another alternative microfluidic device 10" is illustrated. Microfluidic device 10" has a well 56'" having a capillary channel 92 extending therefrom. Capillary channel 92 has a sample outlet 58'". Capillary channel 92 is also illustrative of the fact that well 56'" may be located a distance from an opening 60'" in sample outlet 58'". A nozzle 68'" may also be incorporated near opening 60'".

When dispensing liquid from microfluidic device 10", a receiver plate 94 may be positioned adjacent to microfluidic device 10". Receiver plate 94 has a receiving well 96 that may be used to transport samples of the solution formed in well 56'". Receiving well 96 may have an electrode 98 coupled thereto. Electrode 98 in combination with electrode 66'" has an electrical potential difference. The potential difference allows fluid to be dispensed from sample outlet 58'".

Figure 13:
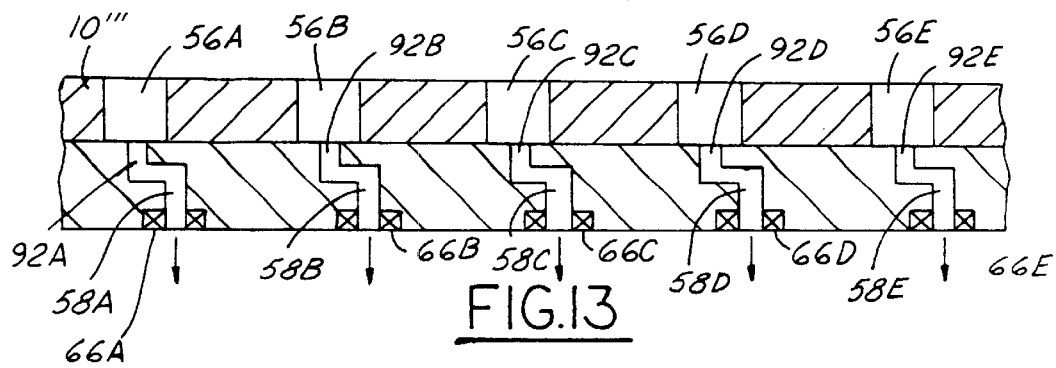
FIG. 13 is a cross-sectional view of a microfluidic device having multiple openings.

Referring now to FIG. 13, a microfluidic device 10′′′ is illustrated similar to that of microfluidic device 10′′ except having a multiple number of wells 56A through 56E. Wells 56A through 56E may each have different solutions therein. Microfluidic device 10′′′ may be used for mixing or dispensing solutions from wells 56A through 56E.

In operation, when fluid is to be transferred within or from a microfluidic device, a droplet is formed at an opening. When a desired volume droplet is formed, a spray voltage is applied to an electrode within the fluid outlet. The application of voltage causes the droplet to be drawn towards an oppositely charged or grounded target. The particles of fluid or charge particles are attracted to the oppositely charged target. Charge particles may form a fluid delivery shaped as a cone or as a stream or as a number of droplets. Depending on the voltage, the characteristics of the fluid delivery may be changed.

One skilled in the art would recognize that a relatively low voltage may be maintained and when a fluid delivery is desired, the voltage may be increased to the desired level to obtain the desired fluid delivery characteristic.

While particular embodiments of the invention have been shown and described, numerous variations and alternate embodiments will occur to those skilled in the art. Accordingly, it is intended that the invention be limited only in terms of the appended claims.

What is claimed is:

1. A mixing apparatus comprising:

a first fluid pressure source;

a second fluid pressure source;

a multilayer microfluidic device comprising a reservoir layer having a first fluid input coupled to said first fluid pressure source and a fluidic delivery layer coupled beneath said reservoir layer having a first channel with a first opening therein, said reservoir layer having a second fluid input coupled to said second fluid pressure source and a said fluidic delivery layer second channel with a second opening therein;

said first fluid pressure source being operative to pump fluid into said channel to form a first droplet at said first opening having a first predetermined volume;

said second fluid pressure source being operative to pump fluid into said second channel to form a second droplet at said second opening having a second predetermined volume;

a first contact proximate said first opening;

a second contact proximate said second opening; and a power source coupled to said first contact and said second contact, said power source selectively applying electrical power to said first contact and said second contact upon the formation of said first and second droplets to mix respective first and second fluid deliveries.

2. A mixing apparatus as recited in claim 1 wherein said first contact and said second contact are simultaneously coupled to said power source.

3. A mixing apparatus as recited in claim 1 further comprising a receiving plate having a mixing reservoir, wherein said first and second fluid deliveries are directed to said mixing reservoir.

* * * * *